Oct. 14, 1941.    C. W. CLARK ET AL    2,259,022
VEHICLE WHEEL
Filed Sept. 19, 1940    2 Sheets-Sheet 1

Inventor
Claud William Clark
Wallace Prouty Edmonds

By *Clarence A. O'Brien*

Attorney

Oct. 14, 1941. C. W. CLARK ET AL 2,259,022
VEHICLE WHEEL
Filed Sept. 19, 1940 2 Sheets-Sheet 2
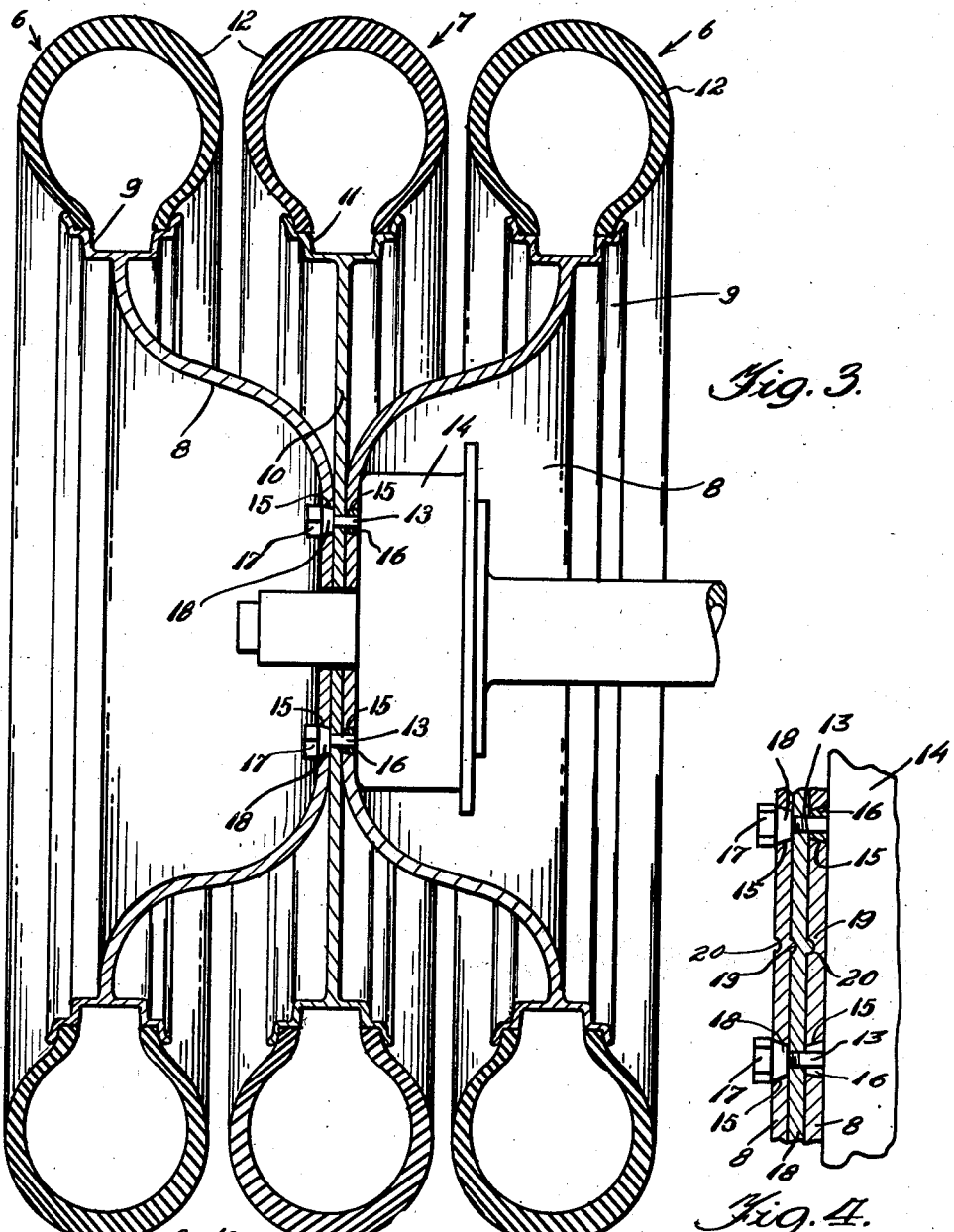
Inventor
Claud William Clark
Wallace Prouty Edmonds
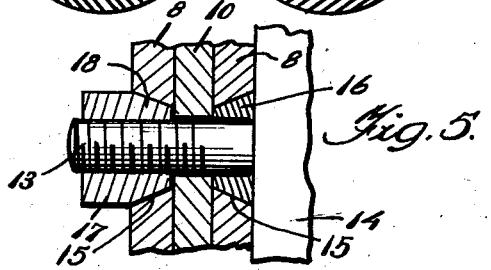
By Clarence A. O'Brien
Attorney Patented Oct. 14, 1941

2,259,022

UNITED STATES PATENT OFFICE 2,259,022

VEHICLE WHEEL

Claud William Clark, Meridian, Miss., and Wallace Prouty Edmonds, Emelle, Ala.

Application September 19, 1940, Serial No. 357,478

2 Claims. (Cl. 301—36)

This invention relates to vehicle wheels and more particularly to pneumatic wheels for vehicles such as motor trucks, tractors and the like.

More particularly the invention has reference to the provision of a "triple wheel," and consists in the provision of three pneumatic wheel units which can be readily assembled and mounted on a single brake drum whereby to afford greater traction surface with consequent greater safety and advantages than is obtainable by the use of the well-known "dual" wheel.

The invention together with its objects and advantages will be best understood from a study of the following description taken in connection with the accompanying drawings wherein:

Figure 3 is a vertical sectional view through the wheel.

Figure 4 is a detail sectional view taken substantially on the line 4—4 of Figure 1, and Figure 5 is an enlarged detail sectional view illustrating certain details hereinafter more fully referred to.

Figure 1:
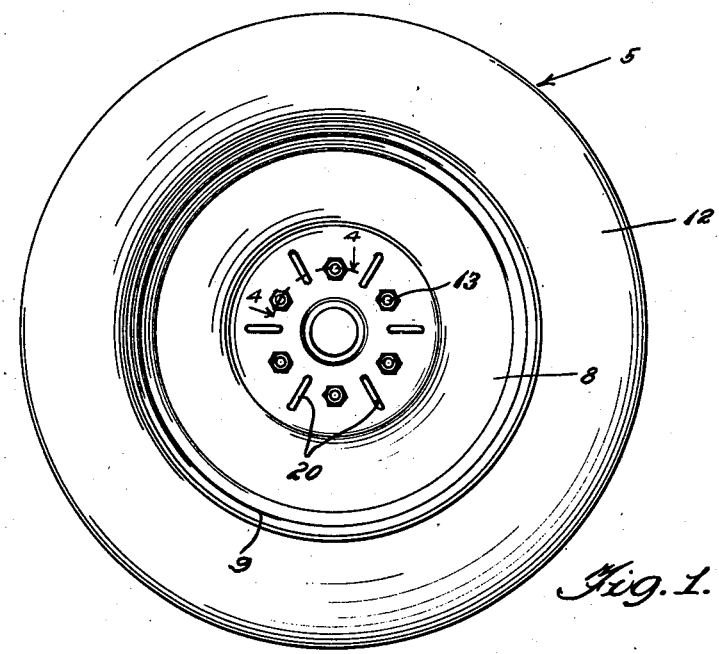
Figure 1 is an elevational view of the out-board side of a vehicle wheel embodying the features of the present invention.
Figure 2:
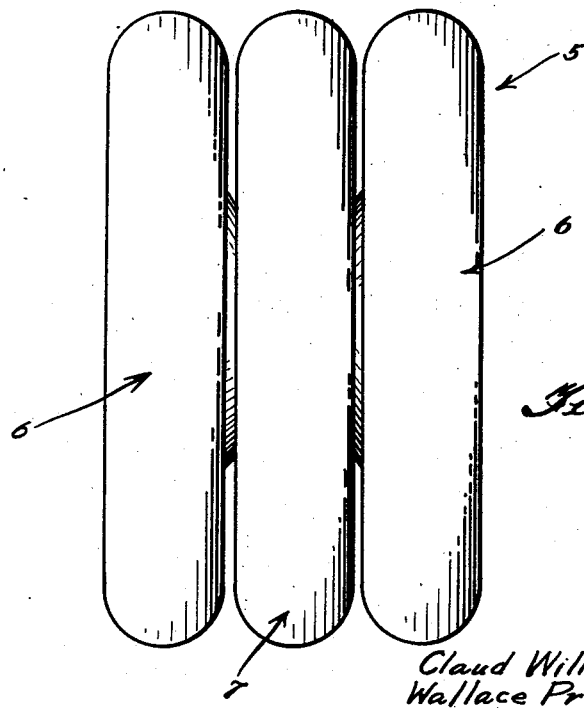
Figure 2 is a peripheral edge elevational view of the wheel.

Referring more in detail to the drawings it will be seen that in the preferred embodiment thereof the wheel indicated generally by the reference numeral 5 consists of three individual wheel units including a pair of wheel units 6—6 and an intermediate wheel unit 7.

Each of the wheel units 6 embodies a disk body 8 that is dished as shown and is provided at its peripheral edge with an integral, flanged rim 9.

The intermediate wheel unit 7 embodies a substantially flat disk-like body 10 having at its peripheral edge an integral, flanged rim 11.

The rims 9 of the wheel units 6, and the rim 11 of the wheel unit 7 are adapted to have mounted thereon pneumatic tires 12 as shown.

In use the wheel units 6 and 7 are assembled as shown, that is with the unit 7 disposed between the units 6, and with the open sides of the disk bodies 8 of the wheel units 6 facing outwardly or away from one another or in opposite directions from the body 10 of the wheel unit 7.

The bodies 8 and 11 are provided with suitable apertures as shown to accommodate the wheel-mounting lugs 13 projecting from the vehicle wheel brake drum 14. In this connection it will be noted that the apertures in the bodies 8 of the wheel units 6 are tapered as indicated at 15, and as clearly shown in Figure 5 there are inserted in the apertures 15 of the wheel body 8 disposed against the brake drum 14 conical bushings 16 while the retaining nuts 17 threaded on the bolts 13 have conical portions 18 that fit in the conical openings 15 of the wheel body 8 remote from the brake drum 14.

Also to prevent relative rotative movement of the bodies 8 and 10, said bodies are provided with radial grooves 20 and radial tongues or ribs 19 complementing the grooves 20 as shown in Figure 4.

Thus it will be seen that the wheel units may be readily assembled and easily mounted on the vehicle for use.

It will also be appreciated that a wheel embodying the features of the present invention permits the use of three separate and distinct rims properly spaced laterally relative to one another and a corresponding number of individual tires thus giving to the wheel greater traction surface.

It will also be appreciated that a wheel structure embodying the features of the present invention will be a great safety factor and will permit the carrying of heavy loads even where a wheel, embodying the features of the present invention, is of a small diameter.

Further in the event the tire on one of the wheel units fails as a result of a blow-out or puncture, two pneumatic tires remain for use and such will be sufficient in many instances to enable the operator of the vehicle to reach his destination, or at least travel a material distance before servicing the wheel.

The invention, together with its many objects and advantages, is believed to be clear to those skilled in the art without requiring more detailed description thereof.

Having thus described the invention what is claimed as new is:

1. A wheel structure comprising three complete wheel units, each wheel unit embodying a body having an integral pneumatic tire-accommodating rim; the body portions of said wheel units having central portions thereof in intimate facial contact and apertured to receive the wheel-mounting bolts projecting from a conventional wheel brake drum for mounting the wheel structure on said drum, and the rims of said wheel units being of substantially the same diameter and in the same plane; the body of the intermediate wheel unit being of flat disk form, and the bodies of the wheel units at opposite sides of the intermediate wheel unit being of dished disk form, with the rims of the last-named wheel units laterally spaced from the rim of the intermediate wheel unit, and each wheel unit having the central portion of the body thereof provided on one face with a circular series of spaced grooves extending radially with respect to the center of said body, and on the opposite face thereof integral ribs of substantially the same longitudinal and transverse dimensions as said grooves, so that the ribs of one wheel unit seat in the grooves of an adjacent wheel unit to facilitate aligning the bodies of the wheel units to receive the wheel-mounting bolts of the brake drum, and the handling of the three-wheel units as a group.

2. A wheel structure of the class described comprising a wheel unit embodying a relatively flat disk body having at its periphery a pneumatic tire-accommodating rim; two additional complete wheel units disposed one at each side of the first-named wheel unit, and each of said additional wheel units embodying a dished body having at its peripheral edge a pneumatic tire-accommodating rim in a plane with the first named pneumatic tire-accommodating rim and spaced therefrom, in combination with a wheel brake drum having wheel-mounting lugs projecting outwardly therefrom and through aligned openings formed in the bodies of said wheel units, and nuts threadedly engaged with the outer ends of said lugs and cooperable with the brake drum for clamping the central portions of the wheel unit bodies in facial contact on the bolts between one side of said drum and said nuts; and the central portions of the bodies of said wheel units being provided on one contact face thereof with radial grooves, and on an opposite contact face thereof with radial ribs complementing said radial grooves for securing the wheel units against rotative movement relative to one another when assembled.

CLAUD WILLIAM CLARK.
WALLACE PROUTY EDMONDS.